3,265,509
MANUFACTURE OF CONFECTIONERY
PRODUCTS BY EXTRUSION
Otto B. Wurzburg, Whitehouse Station, N.J., and Walter G. Kunze, Catonsville, Md., assignors to National Starch and Chemical Corporation, New York, N.Y., a corporation of Delaware
No Drawing. Filed Nov. 13, 1963, Ser. No. 323,244
4 Claims. (Cl. 99—134)

This application is a continuation-in-part of application Serial Number 142,479, filed October 3, 1961, now abandoned.

The present invention relates to the manufacture of candy and other confectionery products and in particular to an improved method for manufacturing such confectionery products.

Starch and modified starches are used in the manufacture of various types of confections. These starches impart texture and body to the confections and give them a desirable feel in the mouth. The starch also serves the function of adjusting the speed of dissolution of the confectionery product.

In the preparation of some types of confections it has been the practice to cook an aqueous mixture of sugars, starch, and other additives, thereafter casting the mixture into molds. A considerable amount of water is initially required in most such processes in order to disperse or dissolve the ingredients of the mixture. After the dispersion is effected, part of the excess water is ordinarily removed by holding the cook at high temperatures to permit evaporation of enough water to achieve the solids content desired for casting. At this point the water content is ordinarily still higher than desired for the final product. In any case, the mixture is still fluid. The final gelling and formation of the solidified plastic confection is obtained only after casting and storing the mix in molds, which are generally formed from dry starch. These molds must usually be maintained in drying rooms at elevated temperatures for extended periods. It is seen that the formation of solid confections has heretofore involved costly and time-consuming storage in molds, to permit gelling and formation of the solid candy. Another disadvantage of the casting procedures heretofore utilized in making candy is that they do not lend themselves to continuous operation, since the casting into molds and the subsequent drying of the confection mixture normally require a discontinuous processing technique.

It is an object of this invention to provide a novel method of producing candy and other confectionery products. It is another object of this invention to provide a method for making confectionery products which drastically reduces the time formerly required to make such products. Another object is to provide a continuous process for the production of confectionery products. Still another object is the elimination of the cumbersome and dust-producing equipment now necessary for imprinting starch molds and re-drying the starch. Other objects and advantages of this invention will be apparent from the following discussion.

In copending applications Serial No. 323,268, and Serial No. 323,224, both filed on November 13, 1963, we described a method for making formed confectionery products by taking a mixture of sugar and a conventional starch, that is, a starch containing not more than about 35% amylose (said starch being converted in the case of the first-named application and essentially native in the case of the second-named application), and subjecting the mixture, in the presence of a stated amount of moisture, to a combination of mixing, sufficient heat to gelatinize the particular starch employed and sufficient pressure to force the resulting plastic mass from an orifice as a solid, formed, shape-retaining confection.

While the use of conventional starches in the process described in the above-described copending applications does indeed result in the improvements therein set forth, we have found that particularly notable advantages are obtained by employing, in the aforesaid process, starches which contain at least 50% amylose, by weight. Such starches are known as high-amylose starches.

It is well known that most starches consist of two fractions, one being a branched fraction known as amylopectin, and the other being a linear fraction known as amylose. Each starch type (e.g. corn, wheat, potato, etc.) contains these two fractions in a particular ratio, characteristic of that particular starch. Some starch, such as waxy maize, is essentially 100% amylopectin. On the other hand none of the conventional starches contain more than about 35% amylose.

In recent years special hybrid varieties of corn have been bred which contain considerably higher proportions of the amylose fraction, namely in the order of 50% and higher. Such starches are known as high-amylose starches. These starches have certain properties which are very different from those of the conventional low-amylose starches. For example, whereas a conventional starch, in admixture with water, will gelatinize at temperatures in the order of 160–180° F., a high-amylose starch may be boiled in water at 212° F. without the granules being gelatinized and dispersed. In order to thoroughly gelatinize a native, granular high-amylose starch (without the use of certain chemicals known to have a dispersing effect) one must use superatmospheric pressures in order to attain temperatures in the order of about 300° F. This characteristic alone has precluded the use of high-amylose starch in prior art methods of candy making, whereby the starch-sugar mixture was dispersed by cooking at ordinary pressures.

Secondly, high-amylose starches have a vastly increased rate of retrogradation, as compared to ordinary starches. That is, after being gelatinized and dispersed in water, they quickly revert to a solid gel.

We have found that when high-amylose starch is used as all or as a major part of the starch component in our extrusion mixture, with sufficient heat and pressure to effect the gelatinization of the starch in situ, one benefits by the fact that the starch granules are gelatinized in situ, within the extruder, resulting in a solid mass, as well as the fact that this gelatinized starch component of the confection retrogrades immediately upon leaving the extruder. This increases the shape-retention or stand-up qualities of the mass leaving the extruder, and results in a firmer candy which can better withstand further treatment, if any is desired. For instance, where some post-extrusive drying is desired, confections made with high-amylose starch (predominantly or entirely) may be dried at much higher temperatures (for instance 215° F.) than is feasible when conventional starches are employed.

It is understood, therefore, that when we employ the term "high-amylose" starch we refer to any starch containing at least 50% of amylose. This starch may be in its native, unconverted form or it may be converted as desired.

According to our process, the mixture of high-amylose starch and sugar is passed, in the presence of no more than about 25% moisture, based on the weight of the total composition, through a heated extruder or other device which subjects the mixture to a combination of mixing, sufficient heat to thoroughly gelatinize the starch in situ, and sufficient pressure to force the resulting plastic mass from an orifice as a solid, formed, shape-retaining confection. Upon emerging from the extruder or equivalent device, the solid mass needs only to be cut to size. There is no need for casting in molds and storing for days, as was often the case with the syrupy fluids formed by hitherto employed processes. The economic advantages are self-evident.

The amount of moisture in the extrusion mixture should preferably be the minimal amount required to gelatinize and disperse the starch under the particular extrusion conditions employed, taking into account the particular starch used, the nature and proportions of the other ingredients, the temperature and pressure employed in the extrusion, and the nature of the particular candy desired. As stated, however, the amount of water is never greater than about 25%, based on the total weight of the composition. We generally prefer that there be present at least 5% moisture. However, the minimum amount of water necessary to produce a mixture wherein the starch component will be gelatinized and dispersed in situ will vary, to some extent, with the degree, if any, to which the starch had been converted. The determination of this minimum amount for any particular starch will present no problems to the practitioner. In calculating the amount of water in the composition, the moisture which may be inherently present in all of the components of the composition must be included. The use of such extremely low amounts of water in combination with the use of ungelatinized, high-amylose starch, and the subjection of the starch-sugar-moisture mixture to the heat-pressure-mixing action of an extruder, with the starch granules being gelatinized and dispersed within the extruder and thus absorbing even the small amount of water present, is what makes our improved product possible. As stated, our product leaves the extruder in the form of a solid plastic mass, which retains its shape and needs no storing in molds. Although in most cases post-extrusive drying is not necessary, it may be found desirable in some cases (especially when dealing with candies which are to undergo further treatment, such as coating with hot sugar or chocolate syrups) to dry for a short period. However, even in such cases the period of drying is not of the same magnitude as was necessitated by prior art processes. The amount of starch in the mixture to be extruded will depend upon the type of confection that is to be made, as well as the particular starch type used. Accordingly, the amount of starch, based on the weight of the entire formulation, may vary from about 10% to about 70%. Although conventional starches may also be present, the highly-amylose starch must constitute a major proportion of the total starch used. Besides the starches and moisture, the remainder of the mixture is composed of sugars as well as minor amounts of desired additives such as coloring or flavoring agents, plasticizers, medicinal agents, and the like.

When we speak herein of sugars, we refer to all commonly used mono- and disaccharides, and materials containing them such as dextrose, starch syrup, levulose, sucrose, invert sugar and those polyhydric alcohols such as sorbitol and mannitol which are characterized by a sweet taste. It might be noted that some of these products, such as sorbitol, have particularly interesting characteristics, such as their low melting point, good compatibility with starch, and their effect in helping to plasticize and disperse the mixture.

In preparing the mixture to be extruded, the practitioner may vary the order of mixing the ingredients to suit his convenience. Thus, the requisite amount of starch and sugar may be mixed together, and the water (if any) may then be sprayed or otherwise combined with the starch-sugar mix. Additives may be added as desired. The resulting mixture, which may be in the form of a dry or damp powder or a syrup, may be slightly heated (e.g. to about 120° F.) if desired, and then fed into the extruder by a pump, a ram or other suitable device.

For the extrusion step, one may employ any device capable of subjecting the mixture to sufficient heat to gelatinize the starch, preferably with some shearing action, and sufficient pressure to force the mixture through an orifice or multiplicity of orifices. The orifice may have any desired size and shape required for the desired pattern. As a result of the combined heat, pressure and mixing action, the starch, sugar and other desired additives are effectively dispersed and mixed, in spite of the extremely low amounts of moisture present.

The extruder may be so devised that the first half of the extruder barrel contains heating elements which cook and gelatinize the starch, whereas the second half of the extruder barrel may be water-cooled, serving to remove a considerable amount of heat from the cooked mixture. Another variation consists in using two or more extruders in tandem, one to heat and the other to cool.

The temperature within the extruder barrel depends upon the amount and type of starch and sugars present in the mixture, as well as the moisture content. In order to realize the most favorable taste and color characteristics in the finished candy, the extrusion temperature should be as low as possible, consistent with the need to gelatinize the starch. Most formulations require temperatures ranging in the 180° F. to 400° F. area (as measured by a thermocouple inserted in the barrel wall), but the particular extrusion temperature required will be a simple matter for the practitioner to determine.

The temperature of the extruder die may be kept within the range of from 90° F. to 175° F., again depending upon the composition of the mixture. The pressures utilized within the extrusion mechanism will vary with the type of extruder and screw employed, the nature of the substance to be extruded, and the construction of the die, and pressures from 50 to 5,000 p.s.i. have been employed. It is understood, of course, that the pressure within the extruder is related to the temperature to be attained, in order to achieve gelatinization and dispersal of the particular starch type employed.

The ability of the starches employed in the confectionery formulations (and particularly the amylose portion thereof) to produce the desired immediate stand-up (shape-retaining) properties may be further enhanced by chilling the confection as it leaves the extruder in the form of an endless ribbon, by depositing it upon a sugar or starch coated conveyor which moves through a channel in which refrigerated air enters at a temperature of about 40° F. The confection may remain in this chilling unit about 10 minutes, after which the confection emerges and is now cut by a rotary knife and coated as desired.

The following examples further illustrate the embodiment of our invention. Unless otherwise specified, all parts are given by weight.

EXAMPLE I

This example illustrates the preparation of confectionery products using the extrusion process of this invention, with native granular high-amylose starch.

In preparing the formulations listed below, we preferred to first blend the requisite amount of water with the starch. To this mixture were then added the sucrose, corn syrup or corn syrup solids. There were then added the coloring agents and flavoring agents, although it should be noted that these may be injected, if desired, later into the cooled section of the extruder barrel or die. The mixture was then heated to about 125° F. The resulting syrupy mass was then pumped into an extruder having a barrel length of 25 inches and having a screw with a diameter of 1¼ inches which rotated at 125 r.p.m. The barrel temperature of the extruder was maintained within a range of from 300° to 400° F. and a pressure of 250 p.s.i. to 2,000 p.s.i., depending upon product composition. The cooked material was then passed from the heated barrel into a cooled barrel consisting of a water cooled cylinder in which a ¾″ conveying screw moved the material in contact with the cold cylinder walls into a shaping die. The temperature of the material in the shaping die was about 90° F. The confectionery material, as it left the die, was a solid plastic which could be cut, sanded, dusted, or treated in any other way desired by the practitioner.

FORMULATION 1

[Total moisture content of formulation—18.2%]

| Component | Moisture Content of Component, Percent | Amount of Component in Formulation (parts by weight) |
|---|---|---|
| Sucrose | 0.2 | 500 |
| High amylose corn starch (55% amylose) | 10.5 | 1,200 |
| Corn syrup solids | 3.5 | 4,300 |
| Water | 100.0 | 1,000 |
| Oil of peppermint | | 4 |
| Oil of spearmint | | 1 |

FORMULATION 2

[Total moisture content of formulation—21.4%]

| | | |
|---|---|---|
| Dehydrated honey | 1.0 | 1,000 |
| High amylose corn starch (55% amylose) | 10.5 | 1,750 |
| Corn syrup solids | 3.5 | 3,050 |
| Water | 100.0 | 1,200 |

FORMULATION 3

[Total moisture content of formulation—15.2%]

| | | |
|---|---|---|
| Sucrose | 0.2 | 1,000 |
| High amylose corn starch (55% amylose) | 10.5 | 1,100 |
| Corn syrup solids | 3.5 | 4,150 |
| Water | 100.0 | 800 |
| Water solution of red food color | 100.0 | 15 |
| Cherry flavor | | 3 |

FORMULATION 4

[Total moisture content of formulation—17.4%]

| | | |
|---|---|---|
| Sucrose | 0.2 | 1,000 |
| High amylose corn starch (70% amylose) | 10.5 | 740 |
| Tapioca starch | 13.0 | 360 |
| Water | 100.0 | 950 |
| Water solution of red food color | 100.0 | 15 |
| Corn syrup solids | 3.5 | 4,000 |
| Cherry flavor | | 3 |

FORMULATION 5

[Total moisture content of formulation—24.4%]

| | | |
|---|---|---|
| Sucrose | 1.0 | 1,250 |
| High amylose corn starch (60% amylose) | 10.0 | 1,300 |
| Water solution of red food color | 100.0 | 25 |
| Water | 100.0 | 1,500 |
| Corn syrup solids | 3.5 | 3,200 |
| Coconut flavor | | 5 |

FORMULATION 6

[Total moisture content of formulation—12.4%]

| | | |
|---|---|---|
| Corn syrup | 20.0 | 300 |
| Water | 100.0 | 25 |
| Sucrose | 1.0 | 300 |
| High amylose corn starch (60% amylose) dextrinized [1] | 2.4 | 100 |

FORMULATION 7

[Total moisture content of formulation—6.7%]

| | | |
|---|---|---|
| Corn syrup | 20.0 | 200 |
| Sucrose | 1.0 | 300 |
| Corn syrup solids | 3.5 | 100 |
| High amylose corn starch (60% amylose) dextrinized [2] | 2.8 | 150 |

[1] When 15 parts of the dextrinized product (anhydrous basis) were mixed with 2 parts of borax (decahydrate) and 100 parts of water, and heated to 185° F., then cooled to 75° F. (with any evaporated water being replaced), and the mixture was tested on a Brookfield Viscosimeter (#2 spindle) at 10 r.p.m., the viscosity was found to be 4,400 centipoises.
[2] When 40 parts of the dextrinized product (anhydrous basis) were mixed with 5 parts of borax (decahydrate) and 100 parts water, heated to 185° F., cooled to 75° F. and tested for viscosity as described above, the viscosity was found to be 1,080 centipoises.

It is understood, of course, that any number of variations may be made in the composition and shape of the confections. Thus, for example, a novel candy bar may be formed by extruding a mixture of the type hereinabove described through a tube die, forming a candy shell, into which any desired filling may be injected. Other variations will be apparent. The scope of our invention encompasses the mixing of a granular, high-amylose starch, with sugar and other additives, the total moisture content being no greater than about 25%, passing the mixture through an extruder or equivalent device capable of applying sufficient heat to gelatinize the starch in situ and to force the resulting solid plastic mass through an orifice. The product is shape-retaining and needs no casting and prolonged storage in molds, as was in fact required by the fluid syrups produced by prior art methods.

We claim:

1. The method of making a confectionery product which comprises taking a mixture of sugar and a starch containing at least 50% amylose, the amount of starch being from about 10% to about 70%, based on the weight of the total composition, said mixture containing no more than about 25% of moisture, based on the weight of the total composition, and said starch being in a non-dissolved form, and subjecting said mixture to simultaneous heat, pressure and mixing action of an extruder, said mixture being initially subjected in said extruder to heat which is at a temperature in the range of from about 180 to 400° F. and finally to heat at a temperature in the range of from about 90 to 175° F. while the pressure to which said mixture is subjected is in the range of from about 50 to 5,000 p.s.i.; thereby effecting a dissolution of the starch and sugar with the simultaneous mixing and mastication of the mixture, and expelling said mixture from the extruder in the form of a solid, plastic, shape-retaining confectionery mass.

2. The method of making a confectionery product which comprises taking a mixture of sugar and a starch containing at least 50% amylose, the amount of starch being from about 10% to about 70%, based on the weight of the total composition, said mixture containing no more than about 25% of moisture, based on the weight of the total composition, and said starch being in a non-dissolved form, and subjecting said mixture to the action of a heated extruder, and applying heat, pressure and shearing action on the mixture in and by the extruder, said mixture being initially subjected to heat in the barrel of said extruder to a temperature in the range of from about 180 to 400° F. and finally in the die of said extruder to a temperature in the range of from about 90 to 175° F. while the pressure to which said mixture is subjected, in said extruder, is in the range of from about 50 to 5,000 p.s.i.; the heat, pressure and shearing action of the extruder on the mixture thereby effecting a dissolution of the starch and sugar with the simultaneous mixing and mastication of the mixture, and expelling the mixture from the extruder in the formation of a solid, plastic, shape-retaining confectionery mass.

3. The method of claim 1 in which the starch containing at least 50% amylose is in its native, unconverted form.

4. The method of claim 1 in which the starch comprises a mixture of starch containing at least 50% amylose and a starch containing less than 50% amylose, the starch containing at least 50% amylose constituting the major proportion of said mixture.

References Cited by the Examiner

UNITED STATES PATENTS

| 1,725,171 | 8/1929 | Anderson | 99—82 |
| 2,197,919 | 4/1940 | Bowman. | |

(Other references on following page)

UNITED STATES PATENTS

| | | | |
|---|---|---|---|
| 2,256,190 | 9/1941 | Bowman | 107—54.6 |
| 2,726,960 | 12/1955 | Bolanowski | 99—134 |
| 2,847,311 | 8/1958 | Doumak et al. | 99—134 |
| 2,915,957 | 12/1959 | Bowman. | |
| 3,062,657 | 11/1962 | Vollink | 99—80 |
| 3,117,006 | 1/1964 | Wenger | 99—80 |

A. LOUIS MONACELL, *Primary Examiner.*

JOSEPH M. GOLIAN, *Assistant Examiner.*